US009177368B2

(12) United States Patent  
Cabral et al.

(10) Patent No.: US 9,177,368 B2
(45) Date of Patent: Nov. 3, 2015

(54) IMAGE DISTORTION CORRECTION (75) Inventors: Brian K. Cabral, San Jose, CA (US); Shang-Hung Lin, San Jose, CA (US); Ignatius Tjandrasuwita, Atherton, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 977 days.

(21) Appl. No.: 12/002,562

(22) Filed: Dec. 17, 2007

(65) Prior Publication Data
US 2009/0154822 A1 Jun. 18, 2009

(51) Int. Cl.
| G06K 9/40 | (2006.01) |
| G09G 5/00 | (2006.01) |
| G06T 1/00 | (2006.01) |
| G06T 15/00 | (2011.01) |
| G06T 15/50 | (2011.01) |
| G06T 15/60 | (2006.01) |
| G06T 5/00 | (2006.01) |

(52) U.S. Cl.
CPC ..................................... *G06T 5/006* (2013.01)

(58) Field of Classification Search
USPC ........................................................ 382/255
See application file for complete search history.

(56) References Cited

U.S. PATENT DOCUMENTS

| 3,904,818 A | 9/1975 | Kovac |
| 4,253,120 A | 2/1981 | Levine |
| 4,646,251 A | 2/1987 | Hayes et al. |
| 4,685,071 A | 8/1987 | Lee |
| 4,739,495 A | 4/1988 | Levine |
| 4,771,470 A | 9/1988 | Geiser et al. |
| 4,920,428 A | 4/1990 | Lin et al. |
| 4,987,496 A | 1/1991 | Greivenkamp, Jr. |
| 5,175,430 A | 12/1992 | Enke et al. |
| 5,261,029 A | 11/1993 | Abi-Ezzi et al. |
| 5,305,994 A | 4/1994 | Matsui et al. |
| 5,387,983 A | 2/1995 | Sugiura et al. |
| 5,475,430 A | 12/1995 | Hamada et al. |
| 5,513,016 A | 4/1996 | Inoue |
| 5,608,824 A | 3/1997 | Shimizu et al. |
| 5,652,621 A | 7/1997 | Adams, Jr. et al. |
| 5,793,433 A | 8/1998 | Kim et al. |
| 5,878,174 A | 3/1999 | Stewart et al. |
| 5,903,273 A | 5/1999 | Mochizuki et al. |
| 5,905,530 A | 5/1999 | Yokota et al. |

(Continued)

FOREIGN PATENT DOCUMENTS

| CN | 1275870 | 12/2000 |
| EP | 0392565 | 10/1990 |

(Continued)

OTHER PUBLICATIONS

Donald D. Spencer, "Illustrated Computer Graphics Dictionary", 1993, Camelot Publishing Company, p. 272.*

(Continued)

*Primary Examiner* — Michelle Entezari (57) ABSTRACT

Methods and systems for reducing or eliminating distortion in an image are described. The approach generally involves determining the distortion introduced by a lens, and modifying a captured image to reduce that distortion. In one embodiment, the distortion information associated with a lens is determined. The distortion information is stored. A captured image taken by that lens is processed, with reference to the distortion information.

25 Claims, 7 Drawing Sheets

(56) References Cited

U.S. PATENT DOCUMENTS

| | | |
|---|---|---|
| 5,995,109 A | 11/1999 | Goel et al. |
| 6,016,474 A | 1/2000 | Kim et al. |
| 6,078,331 A | 6/2000 | Pulli et al. |
| 6,111,988 A | 8/2000 | Horowitz et al. |
| 6,118,547 A | 9/2000 | Tanioka |
| 6,141,740 A | 10/2000 | Mahalingaiah et al. |
| 6,151,457 A | 11/2000 | Kawamoto |
| 6,175,430 B1 | 1/2001 | Ito |
| 6,252,611 B1 | 6/2001 | Kondo |
| 6,256,038 B1 | 7/2001 | Krishnamurthy |
| 6,281,931 B1 | 8/2001 | Tsao et al. |
| 6,289,103 B1 | 9/2001 | Sako et al. |
| 6,314,493 B1 | 11/2001 | Luick |
| 6,319,682 B1 | 11/2001 | Hochman |
| 6,323,934 B1 | 11/2001 | Enomoto |
| 6,392,216 B1 | 5/2002 | Peng-Tan |
| 6,396,397 B1 | 5/2002 | Bos et al. |
| 6,438,664 B1 | 8/2002 | McGrath et al. |
| 6,486,971 B1 | 11/2002 | Kawamoto |
| 6,504,952 B1 | 1/2003 | Takemura et al. |
| 6,584,202 B1 | 6/2003 | Montag et al. |
| 6,594,388 B1 | 7/2003 | Gindele et al. |
| 6,683,643 B1 | 1/2004 | Takayama et al. |
| 6,707,452 B1 | 3/2004 | Veach |
| 6,724,932 B1 | 4/2004 | Ito |
| 6,737,625 B2 | 5/2004 | Baharav et al. |
| 6,760,080 B1 | 7/2004 | Moddel et al. |
| 6,785,814 B1 | 8/2004 | Usami et al. |
| 6,806,452 B2 | 10/2004 | Bos et al. |
| 6,839,062 B2 | 1/2005 | Aronson et al. |
| 6,856,441 B2 | 2/2005 | Zhang et al. |
| 6,891,543 B2 | 5/2005 | Wyatt |
| 6,900,836 B2 | 5/2005 | Hamilton, Jr. |
| 6,950,099 B2 | 9/2005 | Stollnitz et al. |
| 7,009,639 B1 | 3/2006 | Une et al. |
| 7,015,909 B1 | 3/2006 | Morgan, III et al. |
| 7,023,479 B2 | 4/2006 | Hiramatsu et al. |
| 7,088,388 B2 | 8/2006 | MacLean et al. |
| 7,092,018 B1 | 8/2006 | Watanabe |
| 7,106,368 B2 | 9/2006 | Daiku et al. |
| 7,133,041 B2 | 11/2006 | Kaufman et al. |
| 7,133,072 B2 | 11/2006 | Harada |
| 7,146,041 B2 | 12/2006 | Takahashi |
| 7,221,779 B2 | 5/2007 | Kawakami et al. |
| 7,227,586 B2 | 6/2007 | Finlayson et al. |
| 7,245,319 B1 * | 7/2007 | Enomoto ............... 348/222.1 |
| 7,305,148 B2 | 12/2007 | Spampinato et al. |
| 7,343,040 B2 | 3/2008 | Chanas et al. |
| 7,486,844 B2 | 2/2009 | Chang et al. |
| 7,502,505 B2 | 3/2009 | Malvar et al. |
| 7,580,070 B2 | 8/2009 | Yanof et al. |
| 7,627,193 B2 | 12/2009 | Alon et al. |
| 7,671,910 B2 | 3/2010 | Lee |
| 7,728,880 B2 | 6/2010 | Hung et al. |
| 7,750,956 B2 | 7/2010 | Wloka |
| 7,760,936 B1 | 7/2010 | King et al. |
| 7,777,750 B1 * | 8/2010 | Brown et al. ............... 345/522 |
| 7,912,279 B2 | 3/2011 | Hsu et al. |
| 7,948,490 B2 * | 5/2011 | Sloan et al. ............... 345/426 |
| 8,049,789 B2 | 11/2011 | Innocent |
| 8,174,534 B2 * | 5/2012 | Jiao ............... 345/582 |
| 8,238,695 B1 * | 8/2012 | Davey et al. ............... 382/299 |
| 8,314,796 B2 * | 11/2012 | Pratx et al. ............... 345/424 |
| 8,373,718 B2 | 2/2013 | Dutta et al. |
| 8,446,433 B1 * | 5/2013 | Mallet et al. ............... 345/647 |
| 8,494,263 B2 * | 7/2013 | Dempski et al. ............... 382/165 |
| 8,570,634 B2 | 10/2013 | Luebke et al. |
| 8,594,441 B2 | 11/2013 | King et al. |
| 8,629,868 B1 * | 1/2014 | Gardiner et al. ............... 345/419 |
| 8,698,908 B2 | 4/2014 | Slavin |
| 8,698,918 B2 | 4/2014 | Silverstein et al. |
| 8,712,183 B2 | 4/2014 | Cabral et al. |
| 8,723,969 B2 | 5/2014 | Garg et al. |
| 8,724,895 B2 | 5/2014 | Lin et al. |
| 8,737,832 B1 | 5/2014 | Lin et al. |
| 8,749,662 B2 | 6/2014 | Cabral et al. |
| 8,768,160 B2 | 7/2014 | Lin et al. |
| 2001/0001234 A1 | 5/2001 | Addy et al. |
| 2001/0012113 A1 | 8/2001 | Yoshizawa et al. |
| 2001/0012127 A1 | 8/2001 | Fukuda et al. |
| 2001/0015821 A1 | 8/2001 | Namizuka et al. |
| 2001/0019429 A1 | 9/2001 | Oteki et al. |
| 2001/0021278 A1 | 9/2001 | Fukuda et al. |
| 2001/0033410 A1 | 10/2001 | Helsel et al. |
| 2001/0050778 A1 | 12/2001 | Fukuda et al. |
| 2001/0054126 A1 | 12/2001 | Fukuda et al. |
| 2002/0012131 A1 | 1/2002 | Oteki et al. |
| 2002/0015111 A1 | 2/2002 | Harada |
| 2002/0018244 A1 | 2/2002 | Namizuka et al. |
| 2002/0027670 A1 | 3/2002 | Takahashi et al. |
| 2002/0033887 A1 | 3/2002 | Hieda et al. |
| 2002/0041383 A1 | 4/2002 | Lewis, Jr. et al. |
| 2002/0044778 A1 | 4/2002 | Suzuki |
| 2002/0054374 A1 | 5/2002 | Inoue et al. |
| 2002/0063802 A1 * | 5/2002 | Gullichsen et al. ............ 348/607 |
| 2002/0105579 A1 | 8/2002 | Levine et al. |
| 2002/0126210 A1 | 9/2002 | Shinohara et al. |
| 2002/0146136 A1 | 10/2002 | Carter, Jr. |
| 2002/0149683 A1 | 10/2002 | Post |
| 2002/0158971 A1 | 10/2002 | Daiku et al. |
| 2002/0167202 A1 | 11/2002 | Pfalzgraf |
| 2002/0167602 A1 | 11/2002 | Nguyen |
| 2002/0191694 A1 | 12/2002 | Ohyama et al. |
| 2002/0196470 A1 | 12/2002 | Kawamoto et al. |
| 2003/0035100 A1 | 2/2003 | Dimsdale et al. |
| 2003/0067461 A1 | 4/2003 | Fletcher et al. |
| 2003/0122825 A1 | 7/2003 | Kawamoto |
| 2003/0142222 A1 | 7/2003 | Hordley |
| 2003/0146975 A1 | 8/2003 | Joung et al. |
| 2003/0169353 A1 | 9/2003 | Keshet et al. |
| 2003/0169918 A1 * | 9/2003 | Sogawa ............... 382/154 |
| 2003/0197701 A1 | 10/2003 | Teodosiadis et al. |
| 2003/0222995 A1 | 12/2003 | Kaplinsky et al. |
| 2003/0223007 A1 * | 12/2003 | Takane ............... 348/335 |
| 2004/0001061 A1 | 1/2004 | Stollnitz et al. |
| 2004/0001234 A1 | 1/2004 | Curry et al. |
| 2004/0032516 A1 | 2/2004 | Kakarala |
| 2004/0066970 A1 * | 4/2004 | Matsugu ............... 382/217 |
| 2004/0100588 A1 | 5/2004 | Hartson et al. |
| 2004/0101313 A1 | 5/2004 | Akiyama |
| 2004/0109069 A1 | 6/2004 | Kaplinsky et al. |
| 2004/0189875 A1 | 9/2004 | Zhai et al. |
| 2004/0190617 A1 * | 9/2004 | Shen et al. ............ 375/240.16 |
| 2004/0218071 A1 | 11/2004 | Chauville et al. |
| 2004/0247196 A1 | 12/2004 | Chanas et al. |
| 2005/0007378 A1 * | 1/2005 | Grove ............... 345/582 |
| 2005/0007477 A1 * | 1/2005 | Ahiska ............... 348/335 |
| 2005/0030395 A1 | 2/2005 | Hattori |
| 2005/0046704 A1 | 3/2005 | Kinoshita |
| 2005/0099418 A1 * | 5/2005 | Cabral et al. ............... 345/419 |
| 2005/0111110 A1 * | 5/2005 | Matama ............... 359/687 |
| 2005/0185058 A1 | 8/2005 | Sablak |
| 2005/0238225 A1 | 10/2005 | Jo et al. |
| 2005/0243181 A1 | 11/2005 | Castello et al. |
| 2005/0248671 A1 | 11/2005 | Schweng |
| 2005/0261849 A1 | 11/2005 | Kochi et al. |
| 2005/0286097 A1 | 12/2005 | Hung et al. |
| 2006/0050158 A1 | 3/2006 | Irie |
| 2006/0061658 A1 | 3/2006 | Faulkner et al. |
| 2006/0087509 A1 * | 4/2006 | Ebert et al. ............... 345/473 |
| 2006/0133697 A1 | 6/2006 | Uvarov et al. |
| 2006/0176375 A1 | 8/2006 | Hwang et al. |
| 2006/0197664 A1 | 9/2006 | Zhang et al. |
| 2006/0274171 A1 | 12/2006 | Wang |
| 2006/0290794 A1 | 12/2006 | Bergman et al. |
| 2006/0293089 A1 | 12/2006 | Herberger et al. |
| 2007/0091188 A1 | 4/2007 | Chen et al. |
| 2007/0147706 A1 | 6/2007 | Sasaki et al. |
| 2007/0171234 A1 * | 7/2007 | Crawfis et al. ............... 345/587 |
| 2007/0171288 A1 * | 7/2007 | Inoue et al. ............... 348/241 |
| 2007/0236770 A1 | 10/2007 | Doherty et al. |
| 2007/0247532 A1 | 10/2007 | Sasaki |
| 2007/0285530 A1 | 12/2007 | Kim et al. |
| 2007/0291038 A1 * | 12/2007 | Herz et al. ............... 345/501 |

(56) References Cited

U.S. PATENT DOCUMENTS

| | | | | |
|---|---|---|---|---|
| 2007/0291233 | A1* | 12/2007 | Culbertson et al. | 353/34 |
| 2008/0030587 | A1 | 2/2008 | Helbing | |
| 2008/0043024 | A1* | 2/2008 | Schiwietz et al. | 345/442 |
| 2008/0062164 | A1* | 3/2008 | Bassi et al. | 345/214 |
| 2008/0101690 | A1 | 5/2008 | Hsu et al. | |
| 2008/0143844 | A1 | 6/2008 | Innocent | |
| 2009/0010539 | A1 | 1/2009 | Guarnera et al. | |
| 2009/0037774 | A1* | 2/2009 | Rideout et al. | 714/38 |
| 2009/0116750 | A1 | 5/2009 | Lee et al. | |
| 2009/0128575 | A1* | 5/2009 | Liao et al. | 345/552 |
| 2009/0160957 | A1 | 6/2009 | Deng et al. | |
| 2009/0257677 | A1 | 10/2009 | Cabral et al. | |
| 2010/0266201 | A1 | 10/2010 | Cabral et al. | |

FOREIGN PATENT DOCUMENTS

| | | |
|---|---|---|
| EP | 1378790 | 1/2004 |
| EP | 1447977 | 8/2004 |
| EP | 1449169 | 8/2004 |
| EP | 1550980 | 7/2005 |
| GB | 2045026 | 10/1980 |
| GB | 2444470 | 6/2008 |
| GB | 2363018 | 5/2010 |
| JP | 61187467 | 8/1986 |
| JP | 62151978 | 7/1987 |
| JP | 07015631 | 1/1995 |
| JP | 08-079622 | 4/1995 |
| JP | 8036640 | 2/1996 |
| JP | 2000516752 | 12/2000 |
| JP | 2001052194 | 2/2001 |
| JP | 2002-207242 A | 10/2001 |
| JP | 2003-085542 A | 3/2003 |
| JP | 2004-221838 | 8/2004 |
| JP | 2005094048 | 4/2005 |
| JP | 2005-182785 A | 7/2005 |
| JP | 2005520442 | 7/2005 |
| JP | 2006-094494 A | 9/2005 |
| JP | 2007-148500 A | 11/2005 |
| JP | 2006025005 | 1/2006 |
| JP | 2007-233833 A | 3/2006 |
| JP | 2006086822 | 3/2006 |
| JP | 2006121612 | 5/2006 |
| JP | 2006134157 | 5/2006 |
| JP | 2007019959 | 1/2007 |
| JP | 2009021962 | 7/2007 |
| JP | 2007282158 | 10/2007 |
| JP | 2008085388 | 4/2008 |
| JP | 2008113416 | 5/2008 |
| JP | 2008277926 | 11/2008 |
| KR | 1020040043156 | 5/2004 |
| KR | 1020060068497 A | 6/2006 |
| KR | 1020070004202 A | 1/2007 |
| WO | 03043308 | 5/2003 |
| WO | 2004063989 | 7/2004 |
| WO | 2007093864 | 8/2007 |

OTHER PUBLICATIONS

"A Pipelined Architecture for Real-Time Correction of Barrel Distortion in Wide-Angle Camera Images", Hau T. Ngo, Student Member, IEEE and Vijayan K. Asari, Senior Member IEEE, IEEE Transaction on Circuits and Systems for Video Technology: vol. 15 No. 3 Mar. 2005 pp. 436-444.
"Calibration and removal iof lateral chromatic aberration in images" Mallon, et al. Science Direct Copyright 2006 11 pages.
Goshtasby, Ardeshir; "Correction of Image Deformation From Lens Distortion Using Bezier Patches"; 1989; Computer Vision, Graphics, and Image Processing, Vol. 47; pp. 358-394.
Ngo, et al., A Pipelined Architecture for Real-Time Correction of Barrel Distortion in Wide-Angle Camera Images, IEEE Transactions on Circuits and Systems for Video Technology, Mar. 2005, pp. 436-444, vol. 15, No. 3.
Haberacker, Digital Image Processing: Basics and Applications, Library of the German Patent Office, Jul. 31, 1986, Hanser Study Books, Vienna, Austria. Submitted with English Translation.
Weerasinghe et al.; "Method of Color Interpolation in a Single Sensor Color Camera Using Green Channel Separation"; Visual Information Proessing lab, Motorola Australian Research Center; IV 3233-IV3236, Date: Nov. 23, 2009.
Duca et al., "A Relational Debugging Engine for Graphics Pipeline, International Conference on Computer Graphics and Interactive Techniques", ACM SIGGRAPH Jul. 2005, pp. 453-463.
gDEBugger, graphicRemedy, http://www.gremedy.com, Aug. 8, 2006, pp. 1-18.
http://en.wikipedia.org/wiki/Bayer_filter; "Bayer Filter"; Wikipedia, the free encyclopedia; pp. 1-4, Date Apr. 2, 2004.
http://en.wikipedia.org/wiki/Color_filter_array; "Color Filter Array"; Wikipedia, the free encyclopedia; pp. 1-5, Date May 14, 2006.
http://en.wikipedia.org/wiki/Color_space; "Color Space"; Wikipedia, the free encyclopedia; pp. 1-4, Date Sep. 26, 2001.
http://en.wikipedia.org/wiki/Color_translation; "Color Management"; Wikipedia, the free encyclopedia; pp. 1-4, Date Feb. 21, 2003.
http://en.wikipedia.org/wiki/Demosaicing; "Demosaicing"; Wikipedia, the free encyclopedia; pp. 1-5, Nov. 4, 2005.
http://en.wikipedia.org/wiki/Half_tone; "Halftone"; Wikipedia, the free encyclopedia; pp. 1-5, Date Jul. 12, 2002.
http://en.wikipedia.org/wiki/L*a*b*; "Lab Color Space"; Wikipedia, the free encyclopedia; pp. 1-4, Date Nov. 13, 2003.
Keith R. Slavin; Application as Filed entitled "Efficient Method for Reducing Noise and Blur in a Composite Still Image From a Rolling Shutter Camera"; U.S. Appl. No. 12/069,669, filed Feb. 11, 2008.
Ko et al., "Fast Digital Image Stabilizer Based on Gray-Coded Bit-Plane Matching", IEEE Transactions on Consumer Electronics, vol. 45, No. 3, pp. 598-603, Aug. 1999.
Ko, et al., "Digital Image Stabilizing Algorithms Basd on Bit-Plane Matching", IEEE Transactions on Consumer Electronics, vol. 44, No. 3, pp. 617-622, Aug. 1988.
Morimoto et al., "Fast Electronic Digital Image Stabilization for Off-Road Navigation", Computer Vision Laboratory, Center for Automated Research University of Maryland, Real-Time Imaging, vol. 2, pp. 285-296, 1996.
Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.
Parhami, Computer Arithmetic, Oxford University Press, Jun. 2000, pp. 413-418.
S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.
S. Erturk, "Real-Time Digital Image Stabilization Using Kalman Filters", http://www,ideallibrary.com, Real-Time Imaging 8, pp. 317-328, 2002.
Uomori et al., "Automatic Image Stabilizing System by Full-Digital Signal Processing", vol. 36, No. 3, pp. 510-519, Aug. 1990.
Uomori et al., "Electronic Image Stabiliztion System for Video Cameras and VCRS", J. Soc. Motion Pict. Telev. Eng., vol. 101, pp. 66-75, 1992.
D. Doo, M. Sabin "Behaviour of recrusive division surfaces near extraordinary points"; Sep. 1978; Computer Aided Design; vol. 10, pp. 356-360.
D. W. H. Doo; "A subdivision algorithm for smoothing down irregular shaped polyhedrons"; 1978; Interactive Techniques in Computer Aided Design; pp. 157-165.
Davis, J., Marschner, S., Garr, M., Levoy, M., Filling holes in complex surfaces using volumetric diffusion, Dec. 2001, Stanford University, pp. 1-9.
E. Catmull, J. Clark, "recursively generated B-Spline surfaces on arbitrary topological meshes"; Nov. 1978; Computer aided design; vol. 10; pp. 350-355.
http://Slashdot.org/articles/07/09/06/1431217.html, Jul. 9, 2006.
http:englishrussia.com/?p=1377, Oct. 1, 2007.
"Method of Color Interpolation in a Single Sensor Color Camera Using Green Channel Seperation" Weerasighe, et al Visual Information Processing Lab, Motorola Australian Research Center pp. IV-3233-IV3236, 2002.

(56) References Cited

OTHER PUBLICATIONS

J. Bolz, P. Schroder; "rapid evaluation of catmull-clark subdivision surfaces"; Web 3D '02.

J. Stam; "Exact Evaluation of Catmull-clark subdivision surfaces at arbitrary parameter values"; Jul. 1998; Computer Graphics; vol. 32; pp. 395-404.

Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics workshop, pp. 1-10.

Kumar, S., Manocha, D., Interactive display of large scale trimmed NURBS models, 1994, University of North Carolina at chapel Hill, Technical Report, pp. 1-36.

Kuno et al. "New Interpolation Method Using Discriminated Color Correlation for Digital Still Cameras" IEEE Transac. on Consumer Electronics, vol. 45, No. 1, Feb. 1999, pp. 259-267.

Loop, C., DeRose, T., Generalized B-Spline surfaces of arbitrary topology, Aug. 1990, SIGRAPH 90, pp. 347-356.

M. Halstead, M. Kass, T. DeRose; "efficient, fair interpolation using catmull-clark surfaces"; Sep. 1993; Computer Graphics and Interactive Techniques, Proc; pp. 35-44.

T. DeRose, M., Kass, T. Troung; "subdivision surfaces in character animation"; Jul. 1998; Computer Graphics and Interactive Techniques, Proc; pp. 85-94.

Takeuchi, S., Kanai, T., Suzuki, H., Shimada, K., Kimura, F., Subdivision surface fitting with QEM-based mesh simplification and reconstruction of approximated B-spline surfaces, 2000, Eighth Pacific Conference on computer graphics and applications, pp. 202-212.

\* cited by examiner

System 112

FIG. 1

Image 200

Image 210, "Pincushion"

Image 220, "Barrel"

Image 250

Image 260, "Relief Distortion"

FIG. 2

Flowchart 300

FIG. 3

Flowchart 400

FIG. 4

Flowchart 500

System 700

FIG. 7

IMAGE DISTORTION CORRECTION

BACKGROUND

1. Field of the Invention

Embodiments of the present invention relate to correcting image distortion.

2. Related Art

A continual issue when dealing with cameras and other optical devices is the distortion introduced by the lens of the camera itself. Many different kinds of distortion can occur, and are familiar problems for camera designers and photographers alike.

Several approaches are traditionally used, when correcting distortion. In more expensive cameras, such as single-lens reflex (SLR) cameras, combinations of lenses are used in sequence, with each additional piece of glass often designed to reduce or eliminate a particular type of distortion. Less expensive cameras offer correspondingly fewer hardware fixes for the distortion introduced by their lenses, with integrated solutions, such as mobile phone cameras, having almost no inherent distortion correction.

Distortion can also be corrected after an image has been captured. Digital imagery, such as the pictures and video captured by digital cameras and camcorders, can be manipulated after the image has been taken, and the distortion introduced by the camera itself can be nearly completely eliminated.

SUMMARY

Methods and systems for reducing or eliminating distortion in an image are described. The approach generally involves determining the distortion introduced by a lens, and modifying a captured image to reduce that distortion. In one embodiment, the distortion information associated with a lens is determined. The distortion information is stored. A captured image taken by that lens is processed, with reference to the distortion information. By quantifying image distortion in this manner, embodiments of the present invention can be used to improve image quality even in camera systems that utilized a simple lens system.

Another embodiment is described for reducing lens distortion in a captured image. A system is described, having a buffer, for storing information, and a texturing engine, for generating pixel data as part of a graphics processing unit (GPU). The texturing engine is configured to access a correction image stored in the buffer. The texturing engine uses the correction image to generate a corrected image from the captured image.

Another embodiment is also described for warping a captured image to reduce distortion. This approach involves generating distortion correction information. The distortion correction information is stored as a warping texture. The warping texture is loaded into a GPU, e.g., in a texture engine, and the GPU is used to warp the captured image, with reference to the warping texture, to produce a modified image.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in figures herein (e.g., FIG. 5) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Although embodiments described herein may make reference to a CPU and a GPU as discrete components of a computer system, those skilled in the art will recognize that a CPU and a GPU can be integrated into a single device, and a CPU and GPU may share various resources such as instruction logic, buffers, functional units and so on; or separate resources may be provided for graphics and general-purpose operations. Accordingly, any or all of the circuits and/or functionality described herein as being associated with GPU could also be implemented in and performed by a suitably configured CPU.

Further, while embodiments described herein may make reference to a GPU, it is to be understood that the circuits and/or functionality described herein could also be implemented in other types of processors, such as general-purpose or other special-purpose coprocessors, or within a CPU.

Basic Computing System

Figure 1:
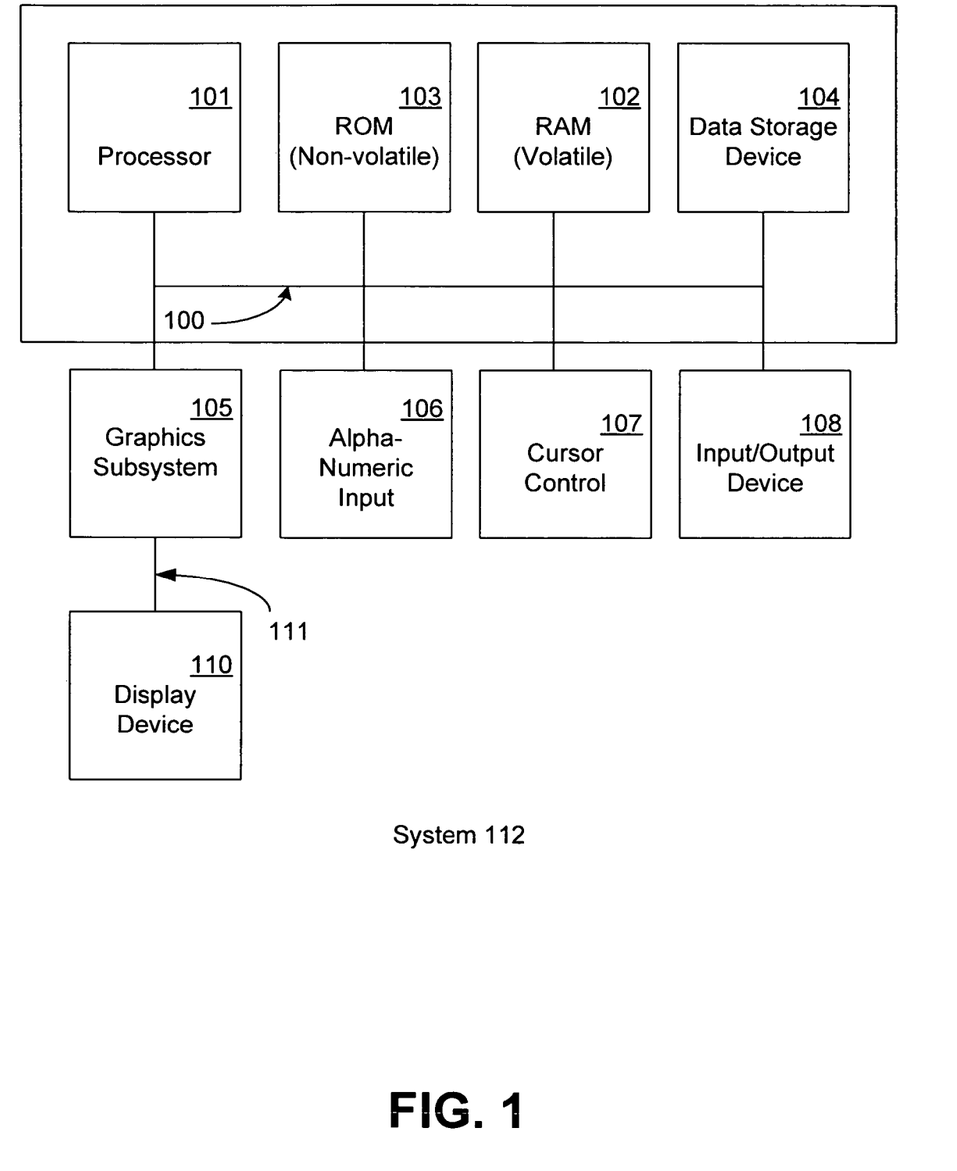
FIG. 1 is a block diagram of an exemplary computer system upon which embodiments of the present invention may be implemented.

Referring now to FIG. 1, a block diagram of an exemplary computer system 112 is shown. It is appreciated that computer system 112 described herein illustrates an exemplary configuration of an operational platform upon which embodiments may be implemented to advantage. Nevertheless, other computer systems with differing configurations can also be used in place of computer system 112 within the scope of the present invention. That is, computer system 112 can include elements other than those described in conjunction with FIG. 1. Moreover, embodiments may be practiced on any system which can be configured to enable it, not just computer systems like computer system 112. It is understood that embodiments can be practiced on many different types of computer system 112. System 112 can be implemented as, for example, a desktop computer system or server computer system having a powerful general-purpose CPU coupled to a dedicated graphics rendering GPU. In such an embodiment, components can be included that add peripheral buses, specialized audio/video components, IO devices, and the like. Similarly, system 112 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan. System 112 can also be implemented as a "system on a chip", where the electronics (e.g., the components 101, 103, 105, 106, and the like) of a computing device are wholly contained within a single integrated circuit die. Examples include a hand-held instrument with a display, a car navigation system, a portable entertainment system, and the like.

Computer system 112 comprises an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Moreover, computer system 112 also comprises a data storage device 104 (e.g., hard disk drive) for storing information and instructions.

Computer system 112 also comprises an optional graphics subsystem 105, an optional alphanumeric input device 106, an optional cursor control or directing device 107, and signal communication interface (input/output device) 108. Optional alphanumeric input device 106 can communicate information and command selections to central processor 101. Optional cursor control or directing device 107 is coupled to bus 100 for communicating user input information and command selections to central processor 101. Signal communication interface (input/output device) 108, which is also coupled to bus 100, can be a serial port. Communication interface 108 may also include wireless communication mechanisms. Using communication interface 108, computer system 112 can be communicatively coupled to other computer systems over a communication network such as the Internet or an intranet (e.g., a local area network), or can receive data (e.g., a digital television signal). Computer system 112 may also comprise graphics subsystem 105 for presenting information to the computer user, e.g., by displaying information on an attached display device 110, connected by a video cable 111. In some embodiments, graphics subsystem 105 is incorporated into central processor 101. In other embodiments, graphics subsystem 105 is a separate, discrete component. In other embodiments, graphics subsystem 105 is incorporated into another component. In other embodiments, graphics subsystem 105 is included in system 112 in other ways.

Correcting Distortion Through the Use of the Texturing Engine

Graphics processing units (GPUs) are increasingly common in many electronic devices. Dedicated computers, such as laptops or desktops, will almost always include a GPU, either as a discrete processor, or integrated with other functionality within the system. GPU functionality can be found in a much broader range of applications, however. Handheld devices, such as personal digital assistants (PDAs), mobile phones and smart phones, and even some cameras may include one or more GPUs to speed the display of information, or to provide additional functionality.

GPUs, and in particular pixel shaders, are ideally suited to the manipulation of images. In the embodiments that follow, approaches are described that harness the functionality of pixel shaders to manipulate images on a per pixel basis. In particular, in some embodiments, pixel shaders are used to correct distortion in a digital image, such as the distortion introduced by a camera lens.

Distortion Types

Many different types of distortion may be introduced, when capturing an image. Causes of distortion may vary, across different embodiments. In some embodiments, for example, distortion is introduced as a result of differences in focal length through different portions of the camera lens or due to imperfections in the optics' manufacture or design. These are often referred to as geometric distortion. In another embodiment, distortion may result from a camera having different focal lengths across different wavelengths of light, e.g., the camera has different focal lengths for red, green, and blue light. Such distortions caused by differing wavelengths of light are often referred to as chromatic distortion. Similarly, the effect that distortion will have upon an image may vary, across different types of distortion and across different embodiments.

Figure 2:
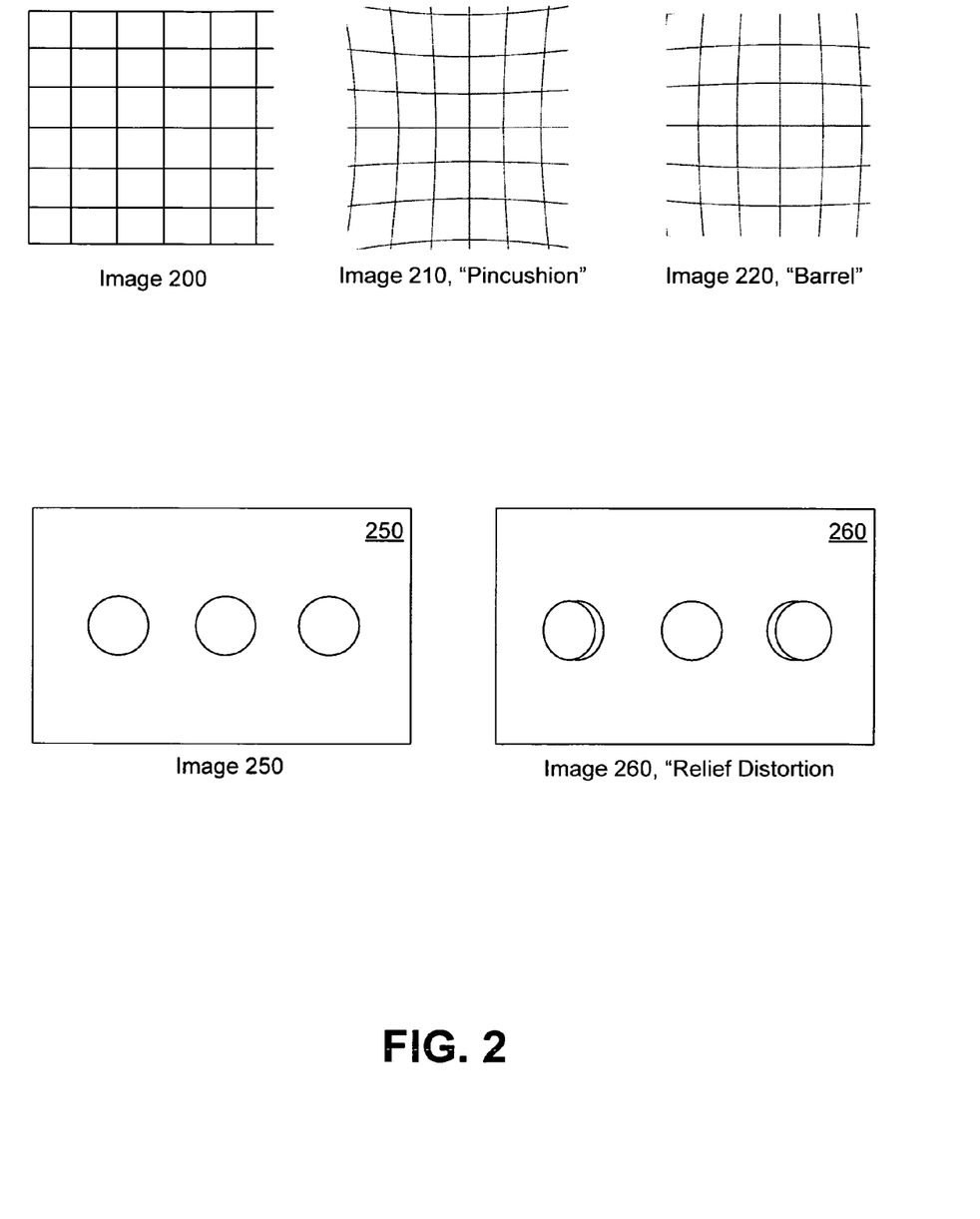
FIG. 2 is an illustration of several types of distortion, upon which embodiments of the present invention may be applied.

With reference now to FIG. 2, several common distortion types are illustrated. While several types of distortion are illustrated, it is understood that embodiments are well suited to applications involving many different types of distortion. FIG. 2 is intended to be illustrative, not exhaustive. Image 200 depicts a picture of an undistorted grid of lines, intersecting at right angles. Image 210 shows the same grid, subjected to "pincushion" distortion. Image 220 shows the grid of image 200, subjected to "barrel" distortion. Image 250 depicts 3 cylindrical objects, viewed from above. Image 260 shows the same objects, subjected to "relief" distortion, wherein objects directly below the camera lens will have only their tops visible, while all other objects will appear to lean away from the center of the image such that their tops and sides are visible. Additional, important lens distortions include but are not limited to: perspective distortion, caused by misalignment of the focal plane relative to the chief ray's axis, and asymmetric distortions, due to "ripples" in the focal or sensor plane or due to gross imperfection in the lens manufacture.

Distortion is not limited to any particular application. Distortion effects occur in video applications, much as they occur in still image applications.

Correcting Distortion

In some embodiments, correcting distortion in an image can occur at any time after the image has been captured. For example, in some embodiments, e.g., where a digital camera is used, distortion is corrected when the image is first taken, and before it is stored. In another embodiment, distortion may be corrected sometime after the image is captured, e.g., before or after some other image processing occurs. In some embodiments, distortion correction can occur at any point where pixel data is available for the image.

Further, it is understood that embodiments are not limited to correction of still images. For example, in one embodiment, e.g., involving a digital camcorder, distortion is corrected as a video is captured, e.g., frame by frame. In another embodiment, distortion is corrected after a video has been captured, e.g., before or after some other video processing operation occurs. In some embodiments, distortion correction can occur at any point where pixel data is available for a frame of a video.

As noted above, many different types of distortion may occur. In some embodiments, distortion is introduced by the camera lens. In other embodiments, distortion is introduced by other factors, e.g., the sensor used to capture data. It is understood that embodiments are well suited to applications involving many different types and sources of distortion. While the exemplary embodiments presented below focus on correcting specific types of distortion, e.g., barrel or pincushion distortion, it is understood that other embodiments may be utilized to correct other types of distortion, e.g., chromatic distortion.

Figure 3:
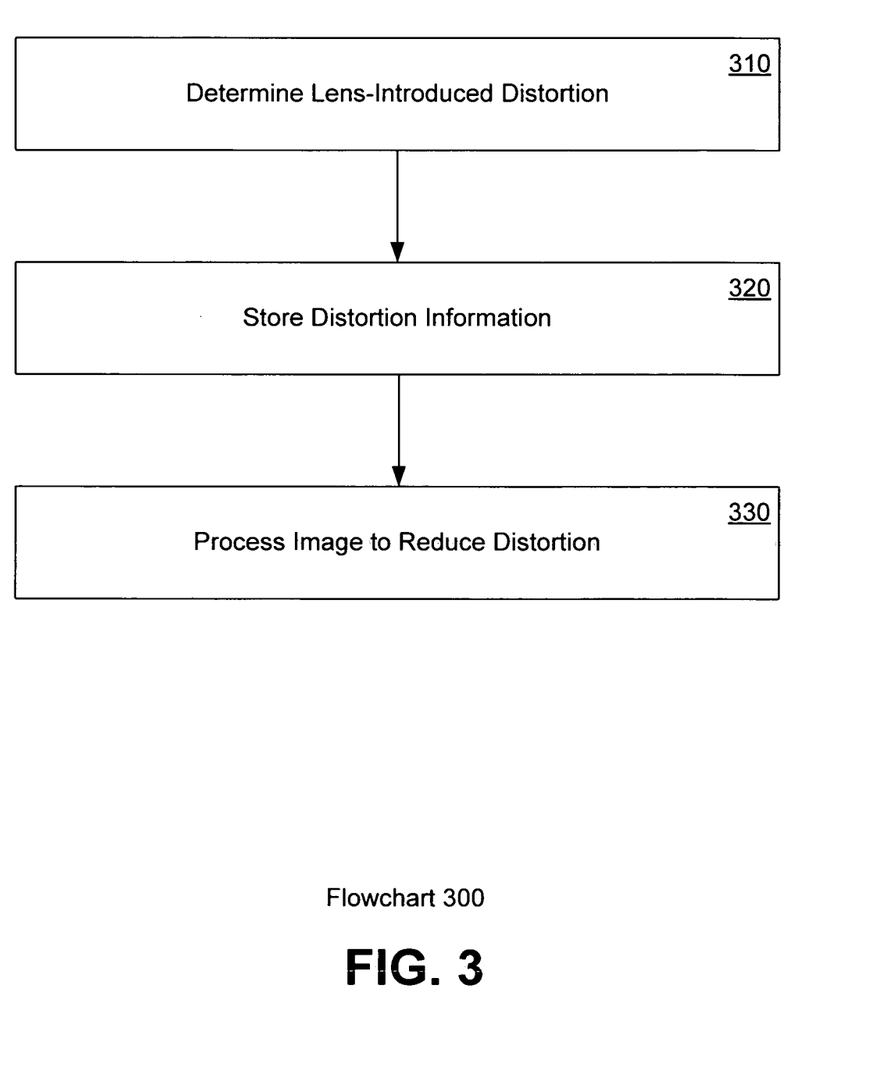
FIG. 3 is a flowchart of an exemplary method of correcting distortion in an image, in accordance with one embodiment.

With reference now to FIG. 3, a flowchart 300 of an exemplary method of correcting distortion in an image is depicted, in accordance with one embodiment. Although specific steps are disclosed in flowchart 300, such steps are exemplary. That is, embodiments of the present invention are well suited to performing various other (additional) steps or variations of the steps recited in flowchart 300. It is appreciated that the steps in flowchart 300 may be performed in an order different than presented, and that not all of the steps in flowchart 300 may be performed.

In step 310, the distortion introduced by a lens is determined. In different embodiments, the step is accomplished in different ways. For example, in one embodiment, the lens being tested is used to capture an image of a known reference picture, such as a rectangular grid like image 200. The captured reference image can then be compared to the known reference picture, e.g., on a pixel per pixel basis. In some embodiments, this comparison is used to generate an equation describing the distortion introduced by the lens. In other embodiments, this comparison is used to generate a distortion mapping, e.g., an image map that describing how to manipulate the captured reference image, in order to reduce or eliminate the distortion introduced by the lens.

In different embodiments, distortion information may be collected in different ways. For example, a single two-dimensional distortion map may be generated, e.g., using horizontal and vertical values to individually address every pixel. In another embodiment, several separable one-dimensional "images" may be used. In another embodiment, a one-dimensional radial image may be used.

In some embodiments, step 310 may be repeated for multiple types of distortion, and/or multiple testing scenarios. For example, in some embodiments, distortion may vary with the focal distance of the lens, such that one equation governs distortion for pictures of close range objects, while a different equation governs distortion for pictures of objects further away from the lens. Further, different distortion may be introduced, depending upon the wavelength of the light, e.g., the color, or upon the general lighting conditions.

With reference to step 320, the distortion information for that lens is stored. In different embodiments, the storage of the distortion information will vary. For example, in one embodiment, distortion information is stored as a texture or image, such that a texturing engine can use the distortion information to warp an image and reduce or eliminate distortion.

Further, in some embodiments, the information stored may vary. In some embodiments, e.g., an embodiment where the equation that governs the distortion for the lens is calculated, the equation is stored. In another embodiment, e.g., where a distortion map is generated, absolute distortion correction information for each pixel may be stored. In one such embodiment, the distortion map corrects for distortion by moving a pixel from one absolute location, in the distorted image, to another absolute location, in the corrected image. In another embodiment, a distortion map is used to store relative location information. For example, the distortion map may indicate that the current pixel should be moved to another location, by specifying a relative distance and/or direction to translate the pixel, rather than providing an absolute location.

With reference to step 330, a captured image is processed to reduce distortion introduced by the lens. In different embodiments, this step may occur at different times. For example, in one embodiment, distortion correction occurs as soon as an image is captured, e.g., when the data is received from the sensor, and before it is stored. In other embodiments, distortion correction occurs before or after some other image processing.

In some embodiments, captured images are processed on a per pixel basis. For each pixel, the distortion correction information for that pixel is retrieved, and the distortion correction information and captured image are used to generate a corrected image. In one embodiment, as described in greater detail below, a pixel shader in a texturing engine is configured to generate a corrected pixel. In one such embodiment, the pixel shader retrieves distortion correction information from the distortion correction image, and uses the distortion correction information to retrieve a pixel from the captured image. The pixel shader outputs a corrected pixel, e.g., by outputting the retrieved pixel in a corrected location in the captured image.

Determining Distortion

In different embodiments, different approaches are utilized to determine the distortion in a picture introduced by the equipment used to capture the picture. In some embodiments, the distortion introduced by a lens is determined. In one such embodiment, this determination is performed by comparing an undistorted reference image with the image captured by the lens.

Figure 4:
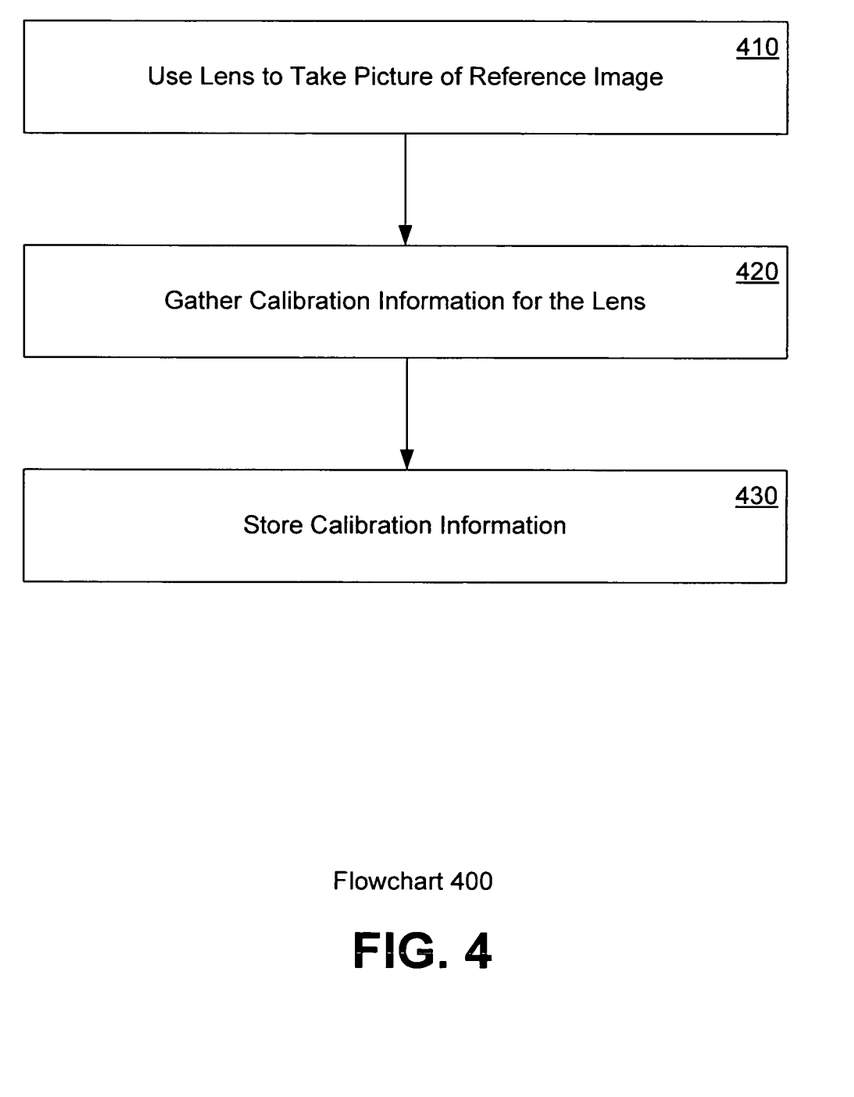
FIG. 4 is a flowchart of an exemplary method of determining distortion for a lens, in accordance with one embodiment.

With reference now to FIG. 4, a flowchart 400 of an exemplary method of determining distortion for a lens is depicted, in accordance with one embodiment. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference now to step 410, the lens being tested is used to take a picture of a known reference image. In different embodiments, the nature of the reference image may vary. For example, when determining barrel or pincushion distortion, it may be useful to utilize a grid image, such as image 200. In another embodiment, where color distortion is being determined, it may be useful to utilize several images, so as to test different colors and wavelengths of light. Moreover, in some embodiments, the same lens may be used to take pictures of multiple reference images, so as to test for the same type of distortion under differing circumstances, e.g., under different lighting conditions, or at different distances from the image.

With reference to step 420, correction, or calibration, information for the lens being tested is gathered. In some embodiments, the lens is calibrated by correcting distortion present in the captured image. In one such embodiment, the captured image is corrected "by hand," e.g., a user manipulates the pixels in the captured image, with reference to the reference image, to correct for distortion introduced by the lens. In other embodiments, the captured image is corrected in other ways, e.g., the captured image is manipulated by an off-line program, with reference to the reference image, to correct the distortions introduced by the lens.

With reference to step 430, the calibration information for the lens is stored. In some embodiments, this calibration information is stored as one or more textures, which a texturing engine can then use to correct distortions introduced by the lens in the future images. As noted previously, the nature of the calibration information may vary, across different embodiments. For example, in some embodiments, calibration information consists of absolute pixel locations, e.g., to indicate where a particular pixel in the captured image should be located in the corrected image. In some other embodiments, calibration information consists of relative pixel locations, e.g., information to indicate that the current pixel should be moved to a new location, relative to its current location. Moreover, in different embodiments, calibration information may comprise different types of images, e.g., a two-dimensional image, or multiple one-dimensional separable images, or a single one-dimensional radial image.

Generating a Corrected Image

In some embodiments, calibration or correction information can be used by a texturing engine to program one or more pixel shaders, in order to generate a corrected version of an image. As noted previously, in different embodiments, the nature of the calibration information may vary; accordingly, in different embodiments, the specifics of how the calibration information is utilized may vary.

Figure 5:
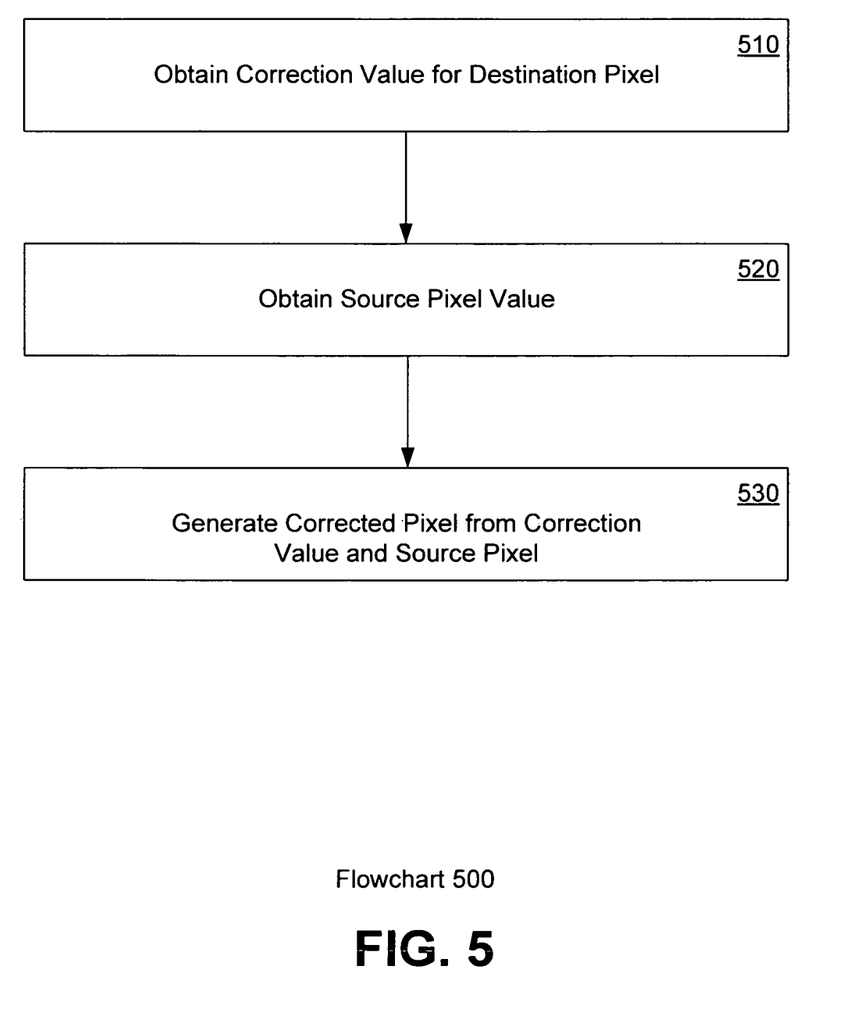
FIG. 5 is a flowchart of an exemplary method of generating a corrected image, in accordance with one embodiment.

With reference now to FIG. 5, a flowchart 500 of an exemplary method of generating a corrected image is depicted, in accordance with one embodiment. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

With reference now to step 510, in one embodiment, a texturing engine obtains a correction value for a destination pixel in a corrected image from a calibration texture. In one such embodiment, the corrected image is generated on a pixel by pixel basis. In this embodiment, the pixel shader is responsible for determining the contents of one particular destination pixel in the corrected image. In some embodiments, the pixel shader obtains a correction value corresponding to the destination pixel, by accessing a calibration texture image. In some such embodiments, this correction value corresponds to a pixel location in a captured image.

In other embodiments, e.g., where color distortion is being corrected, correction values may comprise color "shift" information. For example, in one embodiment, correction values may indicate how to manipulate the RGB values of a pixel, in order to correct for color distortion introduced by the lens.

With reference now to step 520, in one embodiment, the texturing engine obtains a source pixel value from a location in a captured image. In some embodiments, the location of the source pixel value is indicated by the correction value obtained from the calibration texture. In several such embodiments, distortion correction involves "moving" pixels in the captured image to different locations, when generating the corrected image. In one such embodiment, this relocation of pixels allows correction of warping distortion effects, e.g., barrel or pincushion distortion.

In other embodiments, e.g., where color distortion is being corrected, distortion correction involves adjusting the RGB values of the pixel in the captured image, in order to correct for color distortion introduced by the lens.

With reference now to step 530, the correction value and the source pixel value are utilized to generate a corrected pixel. In some embodiments, the pixel shader uses the correction value to obtain a source pixel value, and writes that source pixel value to the correct location in the corrected image, e.g., to correct for warping distortion. In some other embodiments, the pixel shader uses the correction value to modify some value in the source pixel value, and writes that modified value to the current location in the corrected image, e.g., to correct for color distortion.

In some embodiments, the steps in flowchart 500 are repeated for every pixel in the corrected image. In some embodiments, e.g., wherein the GPU or texturing engine has multiple pixel shaders available, it may be possible to process multiple pixels simultaneously. In other embodiments, it may be desirable to process each pixel serially.

It is appreciated that in some embodiments, the method of flowchart 400 may be applied to correct for multiple types of distortion. In some embodiments, several types of distortion may be corrected simultaneously, e.g., both color distortion and warping distortion may be corrected for a single pixel at once, by accessing one or more calibration textures when processing the pixel. In other embodiments, each type of distortion may require a separate processing application, e.g., a captured image may first be corrected for warping distortion, and the resulting corrected image may then be further corrected to reduce color distortion. Moreover, in some embodiments, various combinations of these approaches may be utilized.

It is further appreciated that the method described by a flowchart 500 may be modified. For example, while the method described in flowchart 500 works on a per pixel basis relative to the corrected image, in some embodiments the method may be applied in a manner that works on a per pixel basis relative to the source image.

Pixel Correction

Figure 6:
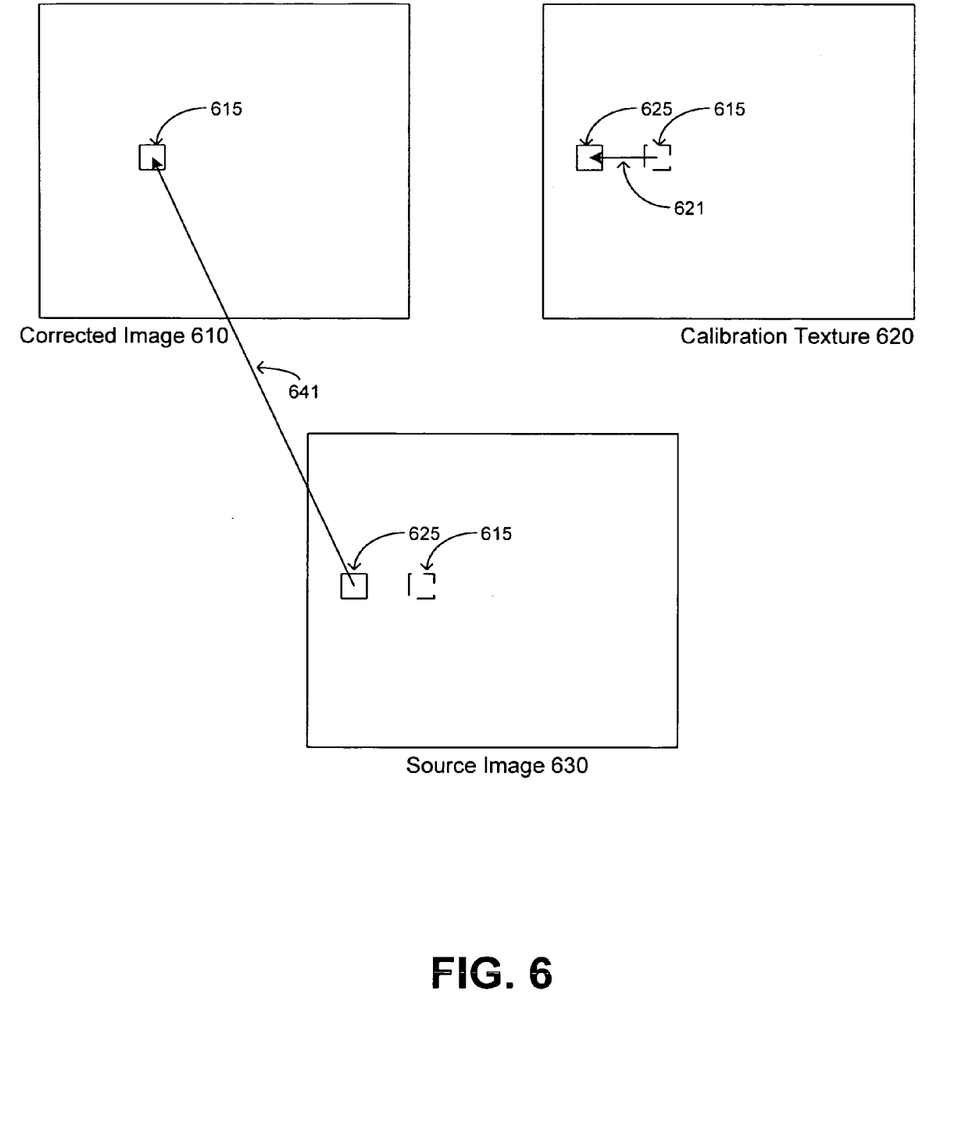
FIG. 6 is an illustration of corrected image generation, in accordance with one embodiment.

With reference now to FIG. 6, an example of corrected image generation is depicted, in accordance with one embodiment. While FIG. 6 depicts certain specific, enumerated features and elements, it is understood that embodiments are well suited to applications involving different, additional, or fewer features or elements.

FIG. 6 depicts a corrected image 610, a calibration texture 620, and a source image 630. In the depicted embodiment, corrected image 610 is being generated from a source image 630. Calibration texture 620 is used to correct a warping distortion introduced by the lens which captured source image 630. If, for example, a mobile phone camera is used to capture source image 630, barrel distortion may be introduced by the inexpensive lens arrangement used in such cameras.

In order to generate a corrected pixel in corrected image 610, e.g., pixel 615, a correction value is obtained. In the depicted embodiment, the correction value is obtained from calibration texture 620. Calibration texture 620 indicates that the correct value for pixel 615 is at location 625 in source image 630. In some embodiments, calibration texture 620 may provide the absolute location, e.g., coordinates, for location 625. In other embodiments, calibration texture 620 may provide the relative location of location 625, e.g., as indicated by arrow 621, position 625 is three pixels to the left of the location of pixel 615.

The texturing engine uses the correction value from calibration texture 620 to obtain the correct pixel value from source image 630. As shown, pixel 635 is "moved" when generating the corrected image, e.g., the contents of pixel 635 in source image 630 are written to pixel 615 in corrected image 610, as indicated by arrow 641.

Again, it is understood that while the example depicted in FIG. 6 describes an approach which focuses on generating the corrected image on a per pixel basis from the corrected image, other embodiments are well suited to other approaches. For example, in one embodiment, in order to generate a corrected image, the pixels in the source image may be processed first. In such embodiment, when pixel 635 is processed, the texturing engine may use the correction information in calibration texture 620 to output pixel 615 in the proper location in corrected image 610. Moreover, in some embodiments, e.g., where a GPU or texturing engine includes multiple pixel shaders, it may be possible to process multiple pixels simultaneously.

Further, it is understood that while the example depicted in FIG. 6 describes an approach which corrects for warping distortion, e.g., barrel distortion, embodiments are well suited to correcting other types of distortion. For example, if color distortion is to be corrected, a calibration texture may include color correction information, rather than positional correction information. In such an embodiment, when generating a corrected pixel, the texturing engine may retrieve the source pixel from the source image, and use the correction information to modify the RGB values of the pixel, before writing a corrected pixel. Moreover, in some embodiments, multiple types of distortion may be corrected.

System for Reducing Distortion

Figure 7:
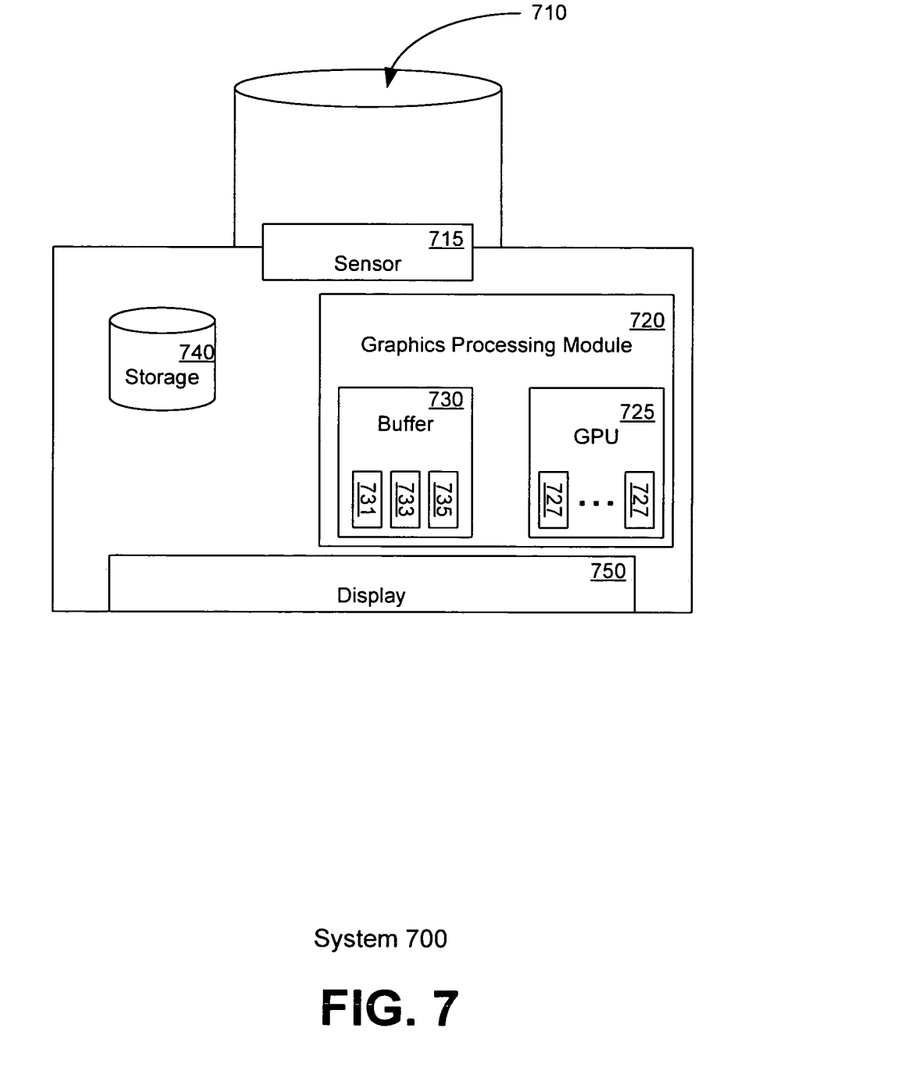
FIG. 7 is a block diagram of another system for reducing distortion in captured images, in accordance with one embodiment.

With reference now to FIG. 7, a system 700 for reducing distortion in captured imagery is depicted, in accordance with one embodiment. While system 700 is depicted as incorporating specific, enumerated features, it is understood that embodiments are well suited to applications involving additional, fewer, or different features or elements.

Further, in different embodiments, system 700 may be incorporated into different devices. For example, in one embodiment, system 700 is incorporated into a digital camera. In another embodiment, system 700 may be incorporated into a camcorder. In another embodiment, system 700 may be incorporated into a different mobile optical device, e.g., a cell phone having camera functionality. Further, in some embodiments, the image capturing components of system 700 may be incorporated into a separate device from the distortion reduction and/or display elements of system 700, e.g., a digital camera used to capture a picture, and a desktop or laptop computer used to reduce distortion and display the image.

In the depicted embodiment, system 700 includes lens 710, sensor 715, graphics processing module 720, storage medium 740, and display 750. As shown, lens 710 incorporates one or more optical elements for focusing light and capturing an image. Sensor 715, in the depicted embodiment, receives the light focused through lens 710. In some embodiments, such as a digital camera, sensor 715 also converts the perceived image into pixel values. As shown in FIG. 7, this captured image can be stored on storage medium 740. Storage medium 740, in different embodiments, may comprise any of a wide variety of storage devices, e.g., internal flash memory, a removable storage device, or any other suitable storage medium.

In the depicted embodiment, graphics processing module 720 is included in system 700. In different embodiments, the purpose and functionality of graphics processing module 720 may vary. For example, in some embodiments, e.g., where system 700 is incorporated into a mobile phone, graphics processing module 720 may be used to display information and render graphics for output to display 750. In the depicted embodiment, graphics processing module 720 includes GPU 725. GPU 725, in some embodiments, is used for a variety of functions, e.g., rendering three-dimensional objects. As shown, GPU 725 includes a number of pixel shaders 727. A pixel shader, in some embodiments, is used by GPU 725 to calculate the appropriate pixel value for a particular pixel when displaying an image.

Graphics processing module 720 is also shown as incorporating a buffer 730. Buffer 730, in some embodiments, is used for storing and retrieving information used by graphics processing module 720 and GPU 725 in displaying an image. In different embodiments, buffer 730 may take different forms. For example, in some embodiments, buffer 730 is composed of random access memory (RAM). In the depicted embodiment, portions of buffer 730 are shown as being allocated for storing a source image 731, a warping image 733, and a corrected image 735.

System 700 may be utilized to reduce distortion in a captured image or video. In one embodiment, the distortion introduced by lens 710 is predetermined. One approach to calculating this distortion is described above, with reference to flowchart 400, e.g., using the lens to capture a picture of a reference image, and calculating the correction necessary in the reference image. This correction information can then be stored, e.g., as warping image 733.

When system 700 later captures an image, the captured image can be processed by graphics processing module 720 to reduce the distortion introduced by lens 710. In the depicted embodiment, the captured image is stored as source image 731. GPU 725 is then utilized to generate a corrected image, corrected image 735. One approach to such a corrected image generation is described above, in flowchart 500.

In some embodiments, where multiple types of distortion may be corrected, it may be necessary to select between several possible warping images. In several such embodiment, graphics processing module 720, or a system processor (not shown), may use additional considerations or data associated with the captured image, in order to select the appropriate correcting texture. For example, if two warping images are available for correcting distortion introduced by lens 710 under two different lighting conditions, the lighting conditions observed by sensor 715 at the time the image was captured may be utilized to select between the two correcting textures.

Embodiments of the present invention are thus described. While the present invention has been described in particular embodiments, it should be appreciated that the present invention should not be construed as limited by such embodiments, but rather construed according to the following claims.

What is claimed is:

1. A method of reducing image distortion, said method comprising:
    determining distortion information associated with a lens system, wherein said distortion information is associated with distortion at a plurality of focal lengths, and wherein said distortion information is further associated with color distortion;
    storing said distortion information;
    processing a captured image taken with said lens system, wherein said processing is performed with reference to said distortion information; and
    generating a corrected image comprising reduced image distortion compared to said captured image, wherein a shader of a graphics processing unit (GPU) is configured to perform said generating by calculating a corrected pixel value for each pixel in said corrected image based on a correction value for each pixel, wherein said correction value is obtained from a calibration texture, wherein said calibration texture is operable to correct a distortion introduced by said lens system, and wherein said shader is operable to be programmed by a texturing engine to use said calibration texture to output each pixel in a proper location in said corrected image.

2. The method of claim 1, wherein said determining comprises:
    taking a calibration picture of a reference image using said lens system; and
    calculating said distortion information by comparing said calibration picture with said reference image.

3. The method of claim 2 further comprising:
    repeating said taking and said calculating for a plurality of reference images, to determine said distortion information for a plurality of distortion types.

4. The method of claim 1, wherein said generating comprises:
    extracting a correction value for a destination pixel in said corrected image from said distortion information;
    obtaining a source pixel value from said captured image;
    modifying said source pixel value with reference to said correction value to generate said destination pixel; and
    repeating said extracting, said obtaining, and said modifying for each of a plurality of destination pixels in said corrected image.

5. The method of claim 1, wherein said storing comprises: writing said distortion information as a correction image.

6. The method of claim 5, wherein said correction image comprises a plurality of correctional pixel data.

7. The method of claim 6, wherein said correctional pixel data comprises position translation information.

8. The method of claim 7, wherein said processing comprises:
    obtaining a source pixel value from said captured image;
    translating, with reference to said position translation information, said source pixel value from a first location in said captured image to a second location in a corrected image; and
    repeating said obtaining and said translating for a plurality of destination pixels in said corrected image.

9. A computer-readable storage medium having computer-readable program code embodied therein for causing a computer system to perform a method of reducing image distortion, said method comprising:
    determining distortion information associated with a lens system, wherein said distortion information is associated with distortion at a plurality of focal lengths, and wherein said distortion information is associated with color distortion;
    storing said distortion information;
    processing a captured image taken with said lens system, wherein said processing is performed with reference to said distortion information; and
    generating a corrected image comprising reduced image distortion compared to said captured image, wherein a shader of a graphics processing unit (GPU) is configured to perform said generating by calculating a corrected pixel value for each pixel in said corrected image based on a correction value for each pixel, wherein said correction value is obtained from a calibration texture, wherein said calibration texture is operable to correct a distortion introduced by said lens system, and wherein said shader is operable to be programmed by a texturing engine to use said calibration texture to output each pixel in a proper location in said corrected image.

10. The computer-readable storage medium of claim 9, wherein said determining comprises:
taking a calibration picture of a reference image using said lens system; and
calculating said distortion information by comparing said calibration picture with said reference image.

11. The computer-readable storage medium of claim 10, wherein said method further comprises:
repeating said taking and said calculating for a plurality of reference images, to determine said distortion information for a plurality of distortion types.

12. The computer-readable storage medium of claim 9, wherein said generating comprises:
extracting a correction value for a destination pixel in said corrected image from said distortion information;
obtaining a source pixel value from said captured image;
modifying said source pixel value with reference to said correction value to generate said destination pixel; and
repeating said extracting, said obtaining, and said modifying for each of a plurality of destination pixels in said corrected image.

13. The computer-readable storage medium of claim 9, wherein said storing comprises:
writing said distortion information as a correction image.

14. The computer-readable storage medium of claim 13, wherein said correction image comprises a plurality of correctional pixel data.

15. The computer-readable storage medium of claim 14, wherein said correctional pixel data comprises position translation information.

16. The computer-readable storage medium of claim 15, wherein said processing comprises:
obtaining a source pixel value from said captured image;
translating, with reference to said position translation information, said source pixel value from a first location in said captured image to a second location in a corrected image; and
repeating said obtaining and said translating for a plurality of destination pixels in said corrected image.

17. A system comprising:
a lens system;
a buffer operable to store a calibration texture; and
a texturing engine operable to generate pixel data, wherein said texturing engine comprises a plurality of pixel shaders and is configured to access said calibration texture from said buffer, wherein said texturing engine is further operable to use said calibration texture to generate a corrected image from a captured image, wherein said calibration texture is associated with distortion at a plurality of focal lengths, and wherein said calibration texture is further associated with color distortion, wherein said calibration texture is operable to correct a distortion introduced by said lens system, and wherein each of said plurality of shaders is configured to calculate a corrected pixel value for each pixel in said corrected image based on a correction value for each pixel obtained from said calibration texture, and wherein said texturing engine is operable to program said plurality of pixel shaders to use said calibration texture to output each pixel in a proper location in said corrected image.

18. The system of claim 17, wherein said plurality of pixel shaders is configured to generate said corrected pixel by obtaining a correction value from said correction image for said corrected pixel, obtaining a source pixel from said captured image, and modifying said source pixel with reference to said correction value to generate said corrected pixel.

19. The system of claim 17 further comprising:
a camera with said lens system operable to provide said captured image, and
wherein said correction image comprises a two-dimensional image.

20. The system of claim 17, wherein said correction image comprises a plurality of separable one-dimensional images.

21. The system of claim 17, wherein said correction image comprises a one-dimensional radial image.

22. The method of claim 1, wherein said distortion at a plurality of focal lengths and said distortion associated with color distortion are corrected simultaneously, wherein at least two different correction processes are carried out, and said at least two different correction processes are carried out simultaneously.

23. The system of claim 17, wherein said plurality of pixel shaders is configured to process a respective plurality of corrected pixels simultaneously to generate said corrected image.

24. The method of claim 1 wherein said correction value further comprises information regarding adjusting a location of a pixel.

25. A method of reducing image distortion, said method comprising:
determining distortion information associated with a lens system, comprising generating a first equation describing distortion information associated with said lens system at a first focal length, and a second equation describing information associated with said lens system at a second focal length;
storing said distortion information, wherein said distortion information comprises an equation governing a distortion associated with said lens system;
processing, on a pixel by pixel basis, a captured image taken with said lens system, wherein said processing is performed with reference to said distortion information associated with said lens system at each of said first and second focal lengths; and
generating a corrected image comprising reduced image distortion compared to said captured image using a calibration texture, wherein said calibration texture is operable to correct a distortion introduced by said lens system.

* * * * *